Jan. 10, 1950 F. F. PFEIFFER ET AL 2,494,142
APPARATUS FOR ONE-TIME POSTING SYSTEMS
Filed March 5, 1945 5 Sheets-Sheet 2
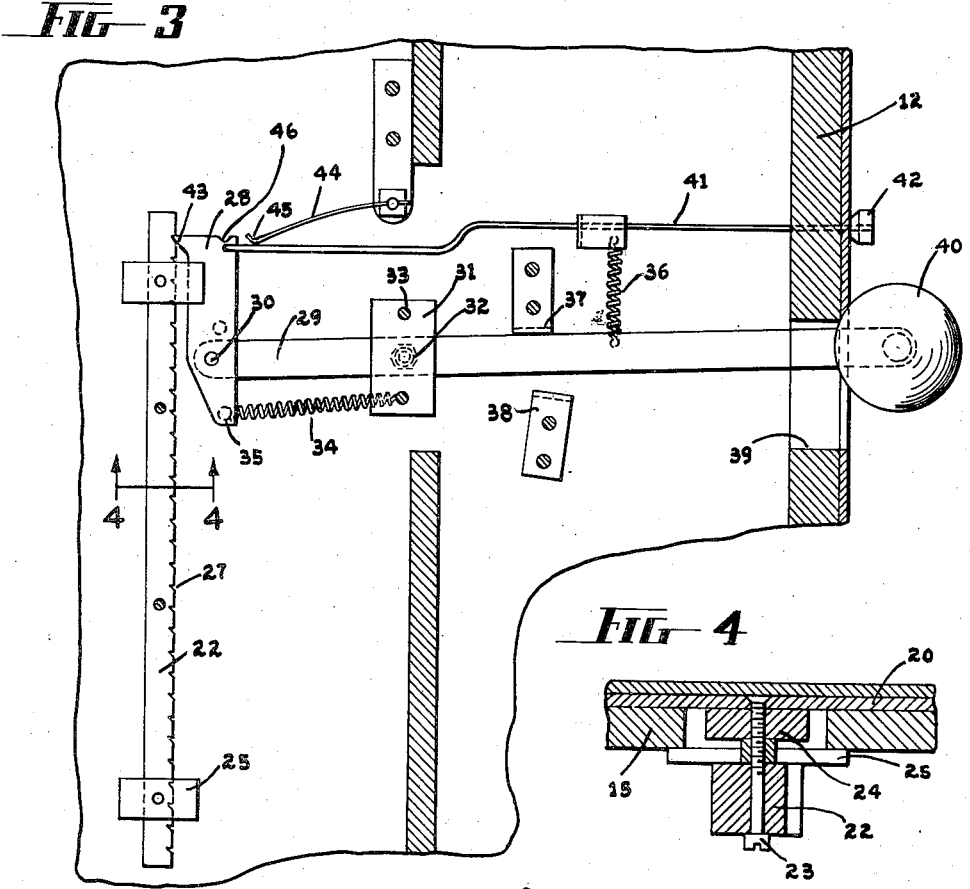
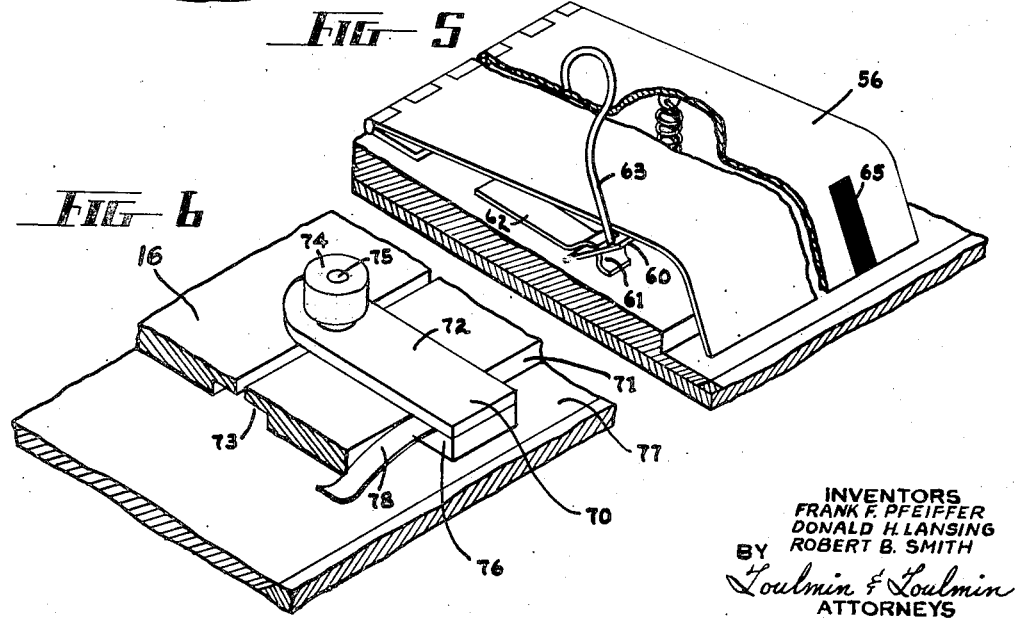
INVENTORS
FRANK F. PFEIFFER
DONALD H. LANSING
ROBERT B. SMITH
BY
Loulmin & Loulmin
ATTORNEYS Jan. 10, 1950  F. F. PFEIFFER ET AL  2,494,142
APPARATUS FOR ONE-TIME POSTING SYSTEMS
Filed March 5, 1945.  5 Sheets-Sheet 3

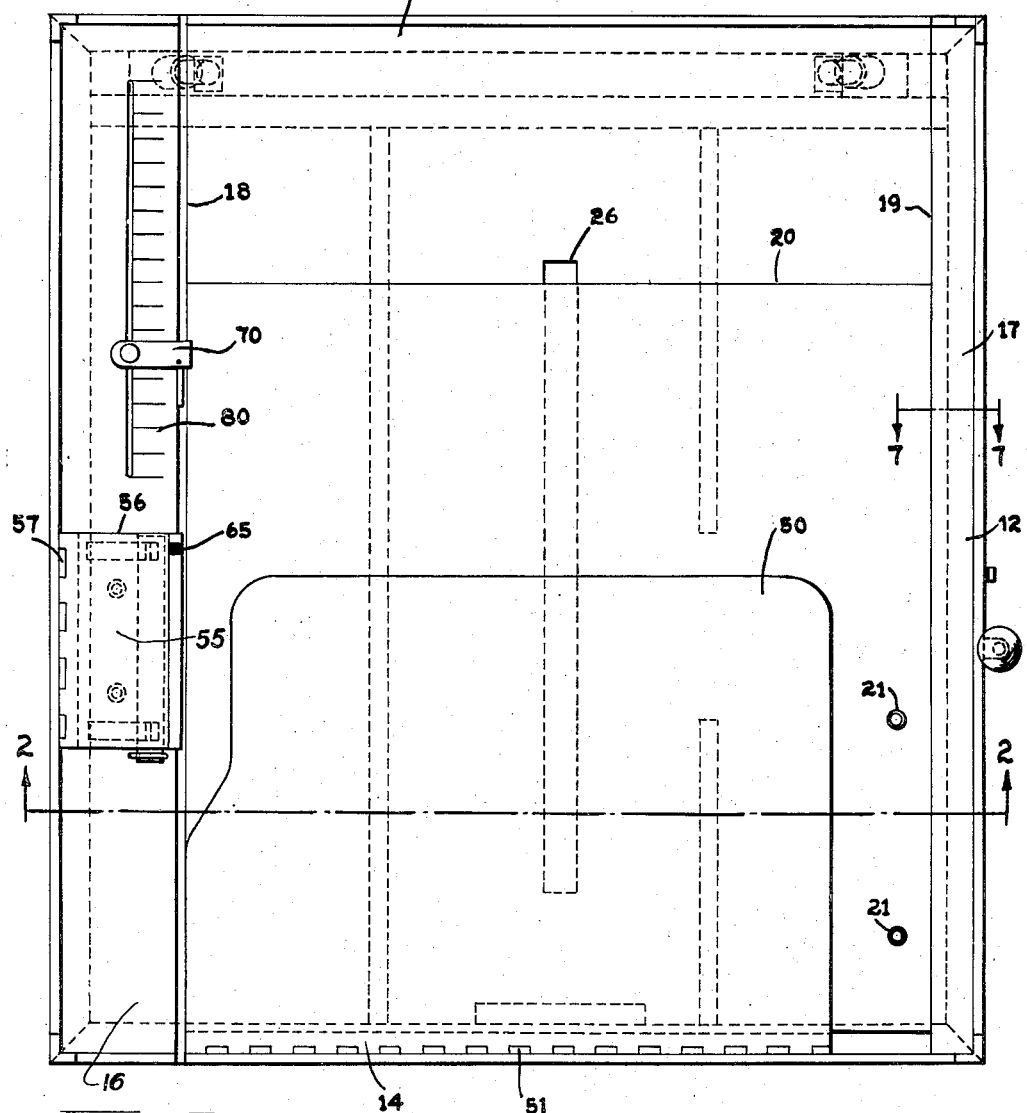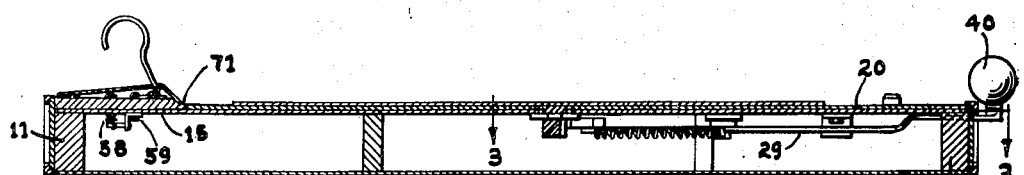

INVENTORS
FRANK F. PFEIFFER
DONALD H. LANSING
BY ROBERT B. SMITH
Toulmin & Toulmin
ATTORNEYS Jan. 10, 1950 F. F. PFEIFFER ET AL 2,494,142
APPARATUS FOR ONE-TIME POSTING SYSTEMS
Filed March 5, 1945 5 Sheets-Sheet 4

FIG. 9

INVENTORS
FRANK F. PFEIFFER
DONALD H. LANSING
BY ROBERT B. SMITH
Toulmin & Toulmin
ATTORNEYS Jan. 10, 1950     F. F. PFEIFFER ET AL     2,494,142

APPARATUS FOR ONE-TIME POSTING SYSTEMS

Filed March 5, 1945     5 Sheets—Sheet 5

INVENTORS
FRANK F. PFEIFFER
DONALD H. LANSING
BY ROBERT B. SMITH

Toulmin & Toulmin
ATTORNEYS

Patented Jan. 10, 1950

2,494,142

UNITED STATES PATENT OFFICE 2,494,142

APPARATUS FOR ONE-TIME POSTING SYSTEMS

Frank F. Pfeiffer, Donald H. Lansing, and Robert B. Smith, Dayton, Ohio, assignors to The Reynolds & Reynolds Company, Dayton, Ohio, a corporation of Ohio Application March 5, 1945, Serial No. 581,130

10 Claims. (Cl. 282—29)

This invention relates to a device upon which record entries can be made simultaneously upon a plurality of record sheets of a bookkeeping system such as a payroll system.

In most bookkeeping systems, and particularly in payroll systems, the system includes a summary sheet upon which all entries are periodically made, an individual payee or employee sheet upon which an entry is made of the disbursements or receipts with regard to the payee or employee, and in payroll systems an individual check is made for each employee upon which it is desirable to have all earnings and deductions set forth so that the employee may know his net pay, and in other systems certain other record entries may be desired on various file sheets for various purposes. It is customary to make the entries on the various entry sheets individually, and thus a duplication of work is required. There are certain business systems available that are adapted for making a single posting of information on a plurality of record entry sheets, but such systems are difficult to handle because of the manner of manipulation required of the various sheets.

It is therefore an object of this invention to provide an apparatus or device that will more conveniently handle a single posting system of record entry sheets and require less manipulation of the sheets when making the various entries required.

It is another object of the invention to provide an apparatus for handling a single posting record system wherein a summary sheet is moved after each entry whereas the record sheets upon which individual postings are made are inserted in the apparatus at the same location for each individual posting thereof, the movement of the summary sheets providing for sequential line postings on the summary sheets.

Another object of the invention is to provide an apparatus or device in accordance with the foregoing object that includes means for locating certain of the individual posting sheets for individual employees, payees or clients so that sequential postings on the individual sheets can always be occasioned upon the apparatus in the same location with reference to the postings on individual payroll checks or other record sheets that are used for specific file purposes that require record entries to be made in the same location on the sheets at each posting period.

Further objects and advantages will become apparent from the drawings and the following description:

Figure 1 is a top elevational view of a record entry board or posting device constructed in accordance with this invention.

Figure 2 is a vertical cross-sectional view taken substantially along line 2—2 of Fig. 1.

Figure 3 is an enlarged cross-sectional view of the apparatus that carries the movable platform of the device which carries a summary sheet, this view being taken substantially along line 3—3 of Fig. 2.

Figure 4 is an enlarged vertical cross-sectional view of a part of the mechanism taken substantially along line 4—4 of Fig. 3.

Figure 5 is a perspective cross-sectional view of the clamping mechanism that holds certain of the sheets upon the record entry board or posting device.

Figure 6 is a perspective cross-sectional view of a part of the mechanism that locates certain of the record sheets upon the device.

Figure 9 illustrates a summary sheet that can be used upon the apparatus of this invention.

Figure 10 illustrates an individual payee or employee record sheet used in association with the summary sheet of Fig. 9.

Figure 11 illustrates an individual payroll check used in association with the record sheet of Fig. 10 and the summary sheet of Fig. 9.

Figure 7:
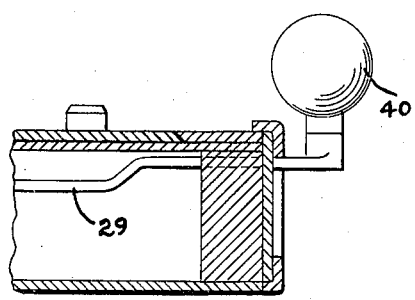
Figure 7 is an enlarged cross-sectional view of a part of the mechanism taken substantially along line 7—7 of Fig. 1.

The apparatus of this invention will be described particularly with reference to its use for a single posting system as applied to a payroll wherein a payroll summary sheet is posted for each pay period, an individual employee record sheet is provided for recording the earnings and deductions for each employee for each pay period, and an individual payroll check is made out that includes information concerning the earnings and deductions for the particular pay period. It will of course be understood that the particular record entry sheets or posting sheets referred to are merely illustrative of the type of posting system that can be used upon the apparatus of this invention, and that additional posting sheets can be incorporated in the posting system.

The payroll check illustrated in Fig. 10 has a main stub portion 1 that comprises the payroll check and a head stub 2 upon which there is printed information concerning the pay period, the time worked, gross earnings, deductions and net pay. This information on the head stub 2 is for the purpose of informing the employee concerning his exact earnings, deductions and net pay. The information on the head stub 2 is specific to the particular pay period for which the payroll check 1 is made out.

It will be noted that the section A of the head stub 2 of the payroll check is reproduced identically in the section B of the individual employee record sheet illustrated in Figure 11 so that when the information line 3 on the head stub 2 is placed in juxtaposed position with the information line 4 on the individual record sheet 5, the information recorded in the line 3 of the payroll check can be recorded in the line 4 of the individual record sheet 5. For this purpose, the portion of the payroll check behind the line 3 is carbonized so that the information will be transferred directly upon the individual payroll sheet 5 in line 4 thereof. It will therefore be seen that if the line 3 of the payroll check 1 is aligned with any one of the lines 4 of the individual payroll card 5 that the information on the payroll check will be transferred to the payroll card, and that if the payroll card 5 is moved upwardly one line for each payroll period, the information for successive pay periods will be applied upon the succcessively lower lines of the individual payroll card 5. Thus, an employee's entire pay record can be applied to a single record sheet.

It will also be noted that the information set forth in portion A of the payroll check and portion B of the individual record sheet 5 is duplicated on the left side of the payroll summary sheet illustrated in Fig. 9. Therefore, if any one of the lines 6 of the payroll summary sheet 7 is aligned with the lines 3 and 4 of the payroll check 1 and the individual employee record sheet 5 with information on the aforementioned sheets can be transferred directly to the left side of the payroll summary sheet. For this purpose, a sheet of carbon paper is placed between the payroll summary sheet 7 and the individual employee record sheet 5. For each individual employee entry, the payroll summary sheet 7 can be moved upwardly so that the entry of another employee can be made upon a sequentially lower line on the summary sheet.

The apparatus upon which the posting system is adapted to be used consists of a record entry or posting apparatus 10 that has a substantially rectangular frame consisting of the side walls 11 and 12 and the end walls 13 and 14. A platform or top cover 15 is secured to the frame members 11, 12, 13 and 14. The platform 15 is provided with a pair of guide rails 16 and 17 that extend parallel with respect to one another so that the edges 18 and 19 respectively thereof will guide the longitudinal movement of the movable carrying board 20. The edges 18 and 19 of the guide members 16 and 17 are undercut angularly to form a V-groove that receives the correspondingly shaped edges of the carrying board 20, see Figure 7.

The carrying board 20 is provided with a pair of pins 21 for locating the summary sheet 7 upon the carrying board, the summary sheet having the locating holes 7a for this purpose. When the carrying board 20 is moved longitudinally from bottom to top of the record entry device, the summary sheet 7 is carried with the same.

The carrying board 20 is adapted to be moved from the bottom toward the top of the record entry board 10 one line at a time according to the spacing of the lines on the payroll summary sheet 7. For this purpose, a ratchet and rack mechanism is provided. A rack 22 is secured to the under-side of the carrying board 20 by means of the screw 23 and the spacing member 24. A pair of plates 25 are secured to the rack 22 to engage the end surface of the platform 15, the upper surface of the platform being engaged by the carrying board 20 to thereby prevent movement of the rack 22 through a slot 26 provided longitudinally in the platform 15 that allows for movement of the spacing member 24 from bottom to top of the record entry device 10.

The rack 22 is provided with a series of notches 27 that are spaced a predetermined distance apart from each other in accordance with the exact line spacing provided on the summary sheet 7. The notches 27 are adapted to be engaged by a pawl 28 that is pivotally mounted on the end of a lever 29 by means of the pivot pin 30. The lever 29 is pivotally carried on a bracket 31 by means of a pivot pin 32, the bracket 31 being secured to the platform 15 by means of the screws 33. A tension spring 34 has one end thereof connected to the screw 33 and the opposite end connected to a pin 35 carried in the lower end of the pawl 28 tending to rotate the pawl in a counter-clockwise direction about the pivot pin 30.

The lever 29 is normally pulled upwardly as viewed in Figure 3 by the tension spring 36 to thereby hold the lever against the stop member 37, the stop member 37 being secured to the platform 15. A second stop member 38 is positioned below the lever 29 for limiting the upward movement of the pawl 28 when the right-hand end of the lever 29 is moved downwardly. The stop 38 is secured to the platform 15 and provides the means for positioning the carrying board 20 for aligning the record lines 6 of the summary sheet with the record lines of the employee record sheet 5 and the payroll check 1. The lever 29 extends through an opening 39 provided in the side wall 12 of the record entry device and is provided with a knob 40 for operating the same.

A rod 41 has one end thereof attached to the upper end of the pawl 28 and has the opposite end thereof extending through the wall 12 to receive a knob 42. When the rod 41 is moved in a rightward direction as viewed in Figure 3, the pawl 28 is pivoted in a clockwise direction about the pin 30 to move the toe 43 of the pawl out of engagement with the rack 22 so that the carrying board 20 can be moved downwardly to its starting position. A spring 44 having a V-shaped end 45 is adapted to engage the V-notch 46 in the end of the pawl to hold the pawl 28 out of engagement with the rack 22.

A metal sheet 50 is hinged to the platform 15 by means of the hinge 51 so that it can be lifted from its position upon the carrying board 20 to allow placement of a summary sheet upon the pegs 21. The metal sheet 50 can then be placed upon the summary sheet so that the writing area will be just above the top edge of the metal sheet 50.

The supplemental sheets, such as those illustrated in Figures 10 and 11 are placed on top of the metal sheet 50 and are adapted to be held in position by a clamping device 55. The clamping device 55 consists of a V-shaped metal plate 56 that has one edge thereof hinged to the guide member 16 by means of the hinge 57. The opposite edge of the clamping plate 56 engages the guide member 16 adjacent the edge 18 thereof. The clamping plate 56 is held in a downward position by means of the tension spring 58 attached between the clamping plate 56 and the bracket 59 secured to the under-side of the platform 15. A cam device is provided for elevating the clamping plate 56 from upon the guide member 16 and consists of a bar 60 having slots therein that receive the V-shaped ends 61 of the leaf springs 62 that are secured to the guide member 16. The cam bar 60 has a handle 63 for operating the same.

When the cam bar 60 is in the position illustrated in Figure 5, the spring 58 will hold the clamping plate 56 down upon the guide member 16. However, counter-clockwise rotation of the handle 63, as viewed in Figure 5, will cause the cam bar to lift the clamping plate 56 from engagement with the guide member 16 so that paper is thereby released, and new sheets can be inserted beneath the clamping plate.

The clamping plate 56 is provided with a guide-mark 65 on the edge thereof with which the entry lines on the sheets 1 and 5 are aligned when making entries, and particularly, the guide-mark 65 is specifically provided for the purpose of aligning the entry line 3 of the form sheet 1.

To provide for proper registry of the entry lines on the form sheet 5 with the entry line 3 of the form sheet 1 when in position upon the entry board, a guide clamp 70 is provided. The guide member 16 is provided with a raised ledge portion 71 against which the form sheet 5 is adapted to be placed. The guide clamp 70 consists of a bar 72 that has a T-headed bolt extending therethrough into engagement with a T-slot 73 provided in the guide member 16. A knob 74 is provided on the end of the T-bolt 75 for clamping the bar 72 upon the guide member 16. The bar 72 extends beyond the ledge 71 of the guide member 16 and has a stop block 76 thereon that engages the lower surface 77 of the guide member 16. A leaf spring 78 extends from between the bar 72 and the stop block 76 to frictionally hold a record sheet that is placed against the stop block 76 and the ledge 71.

As previously mentioned, the form sheet 1 is adapted to be positioned upon the record entry board with the entry line 3 in alignment with the guide mark 65 on a clamp bar 56. To align one of the entry lines on a form sheet 5 with the entry line on the form sheet 1 that is in alignment with the guide mark 65, the guide clamp 70 is adjusted along the T-shaped slot 73 so that when one of the entry lines on the form sheet 5 is in alignment with the guide mark 65, the upper left-hand corner of the form sheet 5 will engage the corner formed by the stop-block 76 and the ledge 71. To quickly locate the guide clamp 70, the face of the guide member 16 may carry the marking lines 80 that are spaced apart a distance equal to the distance between the entry lines on the form sheet 5, and these may be numbered from bottom to top with the number of the pay periods that appear from top to bottom of the form sheet 5.

Figure 8:
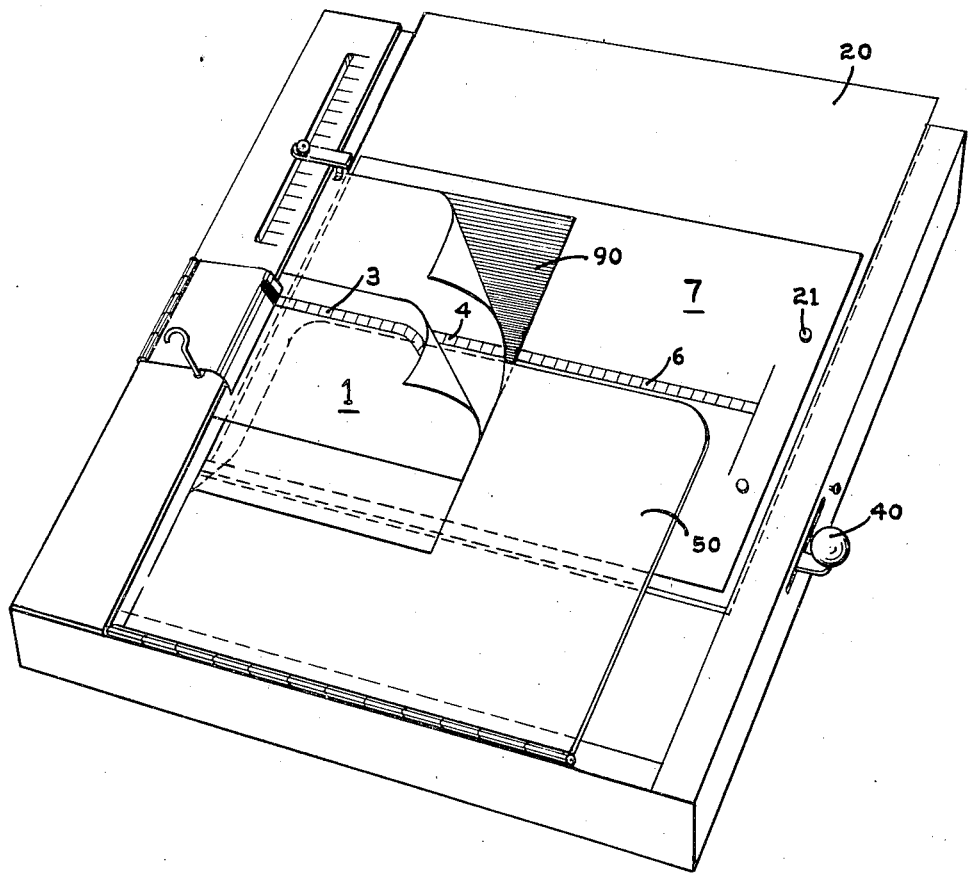
Figure 8 is a perspective elevational view illustrating the use of the device for making posting or record entries.

The use of the record entry board or posting device is illustrated in Figure 8. As shown, a summary sheet 7 has been placed upon the carrying board 20 in position upon the pegs or pins 21. With the summary sheet positioned on the pegs 21, the datum lines automatically align with the guide mark 65. A sheet of carbon paper 90 is then placed along the left-hand side of the summary sheet 7, and the metal sheet 50 is then placed upon the carbon sheet 90 and the summary sheet 7. It will be noted that the datum line appears along the upper edge of the metal sheet 50. The record sheet 5 is then placed upon the metal sheet 50 so that the left-hand edge of the record sheet 5 engages the ledge 71 and the top edge of the record sheet 5 engages the stop block 76. The guide clamp 72 that carries the stop block 76 has previously been set upon one of the guide lines 80 according to the particular pay period for which the payroll is being made out. If the period is the first pay period of the year, the guide clamp will be positioned at the lowermost guide line 80, and as the subsequent pay periods occur during the year, the guide clamp 72 will be raised one line for each pay period so that successively lower datum lines on the form sheets 5 are presented in alignment with the guide mark 65.

With the form sheet 5 in position aligned with the datum line on the summary sheet 7, the form sheet 1 can then be placed upon the form sheet 5 with the date line 3 thereof in alignment with the guide mark 65. As previously mentioned, the reverse side of the form sheet 1 along the datum line 3 is carbonized, thus data posted upon the form sheet 1 along the datum line 3 thereof will be transferred to the datum line 4 on the sheet 5 and the datum line 6 on the summary sheet 7.

After the data has been recorded upon the sheets, the clamp bar 56 is raised to release the record sheets 1 and 5 so that new record sheets 1 and 5 can be placed in position on the entry board. However, before new record sheets 1 and 5 are placed upon the record board, the carrying table 20 is moved upwardly one notch or one datum line by reciprocating the handle 40 to operate the pawl 28 and thereby move the rack 22 which moves the carrying board 20 a distance equal to one datum line. The summary sheet is thus moved upwardly after each entry of data thereon, and new form sheets 1 and 5 are placed on the record board for entry of individual data thereon.

From the foregoing description it will be seen that the form sheets 1 and 5 are always positioned in the same location on the record entry board or posting device when making record entries for any particular period regardless of the number of individual entries that are made, and that the summary sheet containing all of the individual entries is moved upwardly one datum line for each entry on the individual record sheets 1 and 5. Thus, the writing position of the operator is unchanged when making the entries regardless of the location of the entry upon the summary sheet 7, and also regardless of the location of the datum line on the individual record sheet 5.

In describing this invention, the record forms have been described with regard to a payroll system, but it will be understood that the use of the apparatus upon which the forms are applied for payroll entries can be used for other purposes and for other types of entries. As for example, the system could be applied to a factory production record wherein the summary sheet 7 would contain record entries of individual items produced in a department, the summary sheets going to the superintendent of the factory, the form sheets 5 could be departmental record sheets upon which entries are made for the various parts produced in the department, and the record sheet 1 could be a tag to be attached to the product concerned in the entry showing that it has passed inspection. Other systems could be readily devised involving a plurality of entries of identical information wherein the various copies are separately filed, hence the system disclosed with regard to this invention is not to be considered a limiting factor upon the apparatus but merely as illustrative of the manner of use of the invention.

While the apparatus disclosed and described herein constitutes a preferred form of the invention, yet it will be understood that the apparatus is capable of mechanical alteration without departing from the spirit of the invention, and that all modifications that fall within the scope of the appended claims are intended to be included herein.

Having thus fully described our invention, what we claim as new and desire to secure by Letters Patent is:

1. A device for aligning a plurality of record sheets for a one-time posting of data simultaneously on the sheets that includes, a platform having guide means thereon, a movable record sheet carrying-board positioned between said guide means for movement therebetween as guided thereby, clamp means adjacent one edge of said carrying-board for securing record sheets in position upon the device, an indicating marker adjacent said edge for establishing the writing position of a datum line on a record sheet positioned thereadjacent, means movable along said edge relative to said indicating marker for engagement by record sheets to align datum lines on the record sheets in alignment with said indicating marker, means on said carrying-board to align a datum line on a record sheet carried thereby with said indicating marker, and a mechanism operably connected to said carrying-board for moving the same a distance at least equal to the distance between successive datum lines on the record sheet carried upon said board.

2. A device for aligning a plurality of record sheets for a one-time posting of data simultaneously on the sheets that includes, a platform having guide means thereon, a movable record sheet carrying-board positioned between said guide means for securing record sheets upon the device, clamp means adjacent one edge of said carrying board for securing record sheets in position upon the device, an indicating marker adjacent said edge for establishing the writing position of a datum line on a record sheet positioned thereadjacent, means movable along said edge relative to said indicating marker for engagement by record sheets to align datum lines on the record sheets in alignment with said indicating marker, means on said carrying-board to align a datum line on a record sheet carried thereby with said indicating marker, a mechanism operably connected to said carrying-board for moving the same a distance at least equal to the distance between successive datum lines on the record sheet carried upon said board, and a protection sheet hingedly carried upon the device in a stationary position for placement between a record sheet carried upon the carrying-board and other record sheets when clamped in position on the device and aligned with the said indicating marker.

3. A device for aligning a plurality of record sheets for a one-time posting of data simultaneously on the sheets that includes, a platform having guide means thereon, a movable record sheet carrying-board positioned between said guide means for movement therebetween as guided thereby, clamp means hingedly carried upon the device including resilient means for clamping the same upon record sheets positioned upon the device and means to release the clamp means, an indicating marker carried upon said clamp means to establish the writing position of a datum line upon the device, means movable relative to said clamp means for engagement by record sheets to align datum lines on the record sheets in alignment wtih said indicating marker, means on said carrying-board to align a datum line on a record sheet carried thereby with said indicating marker, and a mechanism operably connected to said carrying-board for moving the same a distance at least equal to the distance between successive datum lines on the record sheet carried upon said board.

4. A device for aligning a plurality of record sheets for a one-time posting of data simultaneously on the sheets that includes, means forming a movable platform for carrying a record sheet, a stationary ledge along one longitudinal edge of said platform for receiving the longitudinal edges of record sheets other than that positioned upon said platform, an indicating marker adjacent said edge for establishing the writing position of a datum line on a record sheet positioned with the edge thereof upon said ledge, means movable along said edge relative to said indicating marker for aligning datum lines on record sheets in alignment with said indicating marker, means cooperating with said ledge for frictionally holding record sheets having the edges thereof positioned upon said ledge in stationary position, and a mechanism operably connected to said platform for moving the same along said ledge.

5. A device for aligning a plurality of record sheets for a one-time posting of data simultaneously on the sheets that includes, means forming a movable platform for carrying a record sheet, a stationary ledge along one longitudinal edge of said platform for receiving the longitudinal edges of record sheets other than that positioned upon said platform, an indicating marker adjacent said edge for establishing the writing position of a datum line on a record sheet positioned with the edge thereof upon said ledge, means movable along said edge relative to said indicating marker for aligning datum lines on record sheets in alignment with said indicating marker, means cooperating with said ledge for frictionally holding record sheets having the edges thereof positioned upon said ledge in stationary position, a cover sheet hinged adjacent said ledge for positioning and having the forwardmost transverse edge thereof positioned closely adjacent to said indicating marker and normal to said ledge, and a mechanism operably connected to said platform for moving the same along said ledge.

6. A device for aligning a plurality of record sheets for a one-time posting of data simultaneously on the sheets that includes, means forming a movable platform for carrying a record sheet, a stationary ledge along one longitudinal edge of said platform for receiving the longitudinal edges of record sheets other than that positioned upon said platform, stationarily positioned clamp means cooperating with said ledge for holding record sheets having the edges thereof positioned upon said ledge in stationary position, and individual aligning means positioned along said ledge for individually aligning record sheets adapted to have the edges thereof positioned upon said ledge to position the datum lines thereof in juxtaposition, and a mechanism operably connected to said platform for moving the same along said ledge.

7. A device for aligning a plurality of record sheets for a one-time posting of data simultaneously on the sheets that includes, a sheet metal platform having guide means thereon, a movable record sheet carrying member cooperating with said guide means and arranged for vertical sliding movement relative to said platform, means carried by said record sheet carrying member for positioning a first record sheet in a predetermined relationship relative to said record sheet carrying member, a shet metal protective sheet hingedly carried adjacent the lower edge of said platform so as to overlie the lower portion of said first named record sheet and said record sheet carrying member, means adjustably secured adjacent one side edge of said platform for adjustably positioning a second record sheet in overlapping relationship to said movable record sheet carrying member, said last named means including means for releasably holding said second record sheet in position with a predetermined datum line thereon arranged in alignment with a complementary datum line on said first named record sheet, means adjacent said edge for positioning a third record sheet in overlapping relationship to said second record sheet and including means for aligning a datum line on said third record sheet with the complementary datum lines on said first and second named record sheets, and means for shifting said record sheet carrying member relative to said platform, said last named means comprising means located adjacent one edge of said platform for moving said platform a distance substantially equal to the distance between successive datum lines on said first named record sheet.

8. A device for aligning a plurality of record sheets for a one-time posting of data simultaneously on the sheets that includes, a platform having guide means thereon, a movable record sheet carrying board cooperating with said guide means for movement relative to said platform, record sheet positioning means adjacent one edge of said carrying board for securing record sheets in position including means for establishing the writing position of a datum line on a record sheet positioned thereadjacent, means movable along said edge relative to said means for establishing said writing position for engagement by record sheets to align datum lines on the record sheets in alignment with said datum lines, means on said carrying board to align a datum line on the record sheet carried thereby with said first named datum line, and a pawl and rack mechanism including a rack operably connected to said carrying board for moving the same a distance at least equal to the distance between successive datum lines on the record sheet carried upon said board.

9. A device for aligning a plurality of record sheets for a one-time posting of data simultaneously on the sheets that includes, a platform having guide means thereon, a movable record sheet carrying board cooperating with said guide means and slidably mounted on said platform for securing record sheets upon the device, means adjacent one edge of said carrying board for securing record sheets in position upon the device including positioning means adjacent said edge for establishing the writing position of a datum line on a record sheet positioned thereadjacent, means movable along said edge relative to said positioning means for engagement by record sheets to align datum lines on the record sheets in alignment with said first named datum line, means on said carrying board to align a datum line on a third record sheet carried thereby with said first named datum line, a pawl and rack mechanism including a rack operably connected to said carrying board for moving the same a distance at least equal to the distance between successive datum lines on the record sheet carried by said board, and a protective sheet hingedly carried upon the device in a stationary position for placement between a record sheet carried upon the carrying board and other record sheeets when held in position on the device.

10. A device for aligning a plurality of unlike record sheets for a one-time posting of data simultaneously on the sheets that includes, a stationary platform having a vertically extending guide slot adjacent the left edge thereof, a vertically movable record sheet carrying board carried by said stationary platform, a guide member provided on said stationary platform adjacent said left edge for positioning the longitudinal edges of record sheets other than that positioned upon said movable board, an adjusable stop slidably mounted within said slot for vertically positioning a record sheet with a given datum line thereon arranged in alignment with a complementary datum line on a record sheet carried by said movable board, means carried by said platform for holding a record sheet in a fixed relationship on said platform with a datum line of said last named record sheet arranged in alignment with said aforementioned complementary datum lines, and mechanism including an operator disposed adjacent the right edge of said stationary platform for moving said board by steps substantially equal to the distance between successive datum lines on the record sheet carried by said platform.

FRANK F. PFEIFFER.
DONALD H. LANSING.
ROBERT B. SMITH.

REFERENCES CITED

The following references are of record in the file of this patent:

UNITED STATES PATENTS

| Number | Name | Date |
|---|---|---|
| 1,025,744 | Houghton | May 7, 1912 |
| 2,204,133 | Haney | June 11, 1940 |
| 2,256,533 | Taggart | Sept. 23, 1941 |
| 2,301,482 | Uhl | Nov. 10, 1942 |
| 2,330,886 | Hediger | Oct. 5, 1943 |

FOREIGN PATENTS

| Number | Country | Date |
|---|---|---|
| 650,492 | Germany | Sept. 23, 1937 |